(12) United States Patent
Eide et al.

(10) Patent No.: US 10,372,649 B2
(45) Date of Patent: Aug. 6, 2019

(54) PCIE LINK RESET TO MINIMIZE WORKLOAD IMPACT (71) Applicant: International Business Machines Corporation, Armonk, NY (US)

(72) Inventors: Curtis S. Eide, Rochester, MN (US); Christopher J. Engel, Rochester, MN (US); Aditya Saripalli, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/343,194

(22) Filed: Nov. 3, 2016

(65) Prior Publication Data
US 2018/0121290 A1 May 3, 2018

(51) Int. Cl.
*G06F 11/00* (2006.01)
*G06F 13/40* (2006.01)
*G06F 13/42* (2006.01)
*G06F 11/07* (2006.01)

(52) U.S. Cl.
CPC ...... *G06F 13/4022* (2013.01); *G06F 11/0745* (2013.01); *G06F 11/0793* (2013.01); *G06F 13/4282* (2013.01); *G06F 2213/0026* (2013.01)

(58) Field of Classification Search
CPC .............. G06F 11/1441; G06F 11/1438; G06F 13/4022; G06F 13/4282
See application file for complete search history.

(56) References Cited

U.S. PATENT DOCUMENTS

| | | | |
|---|---|---|---|
| 2008/0063394 A1 | 3/2008 | Chi | |
| 2008/0201616 A1 | 8/2008 | Ashmore | |
| 2009/0265590 A1* | 10/2009 | Li | G06F 11/2733 714/716 |
| 2011/0167190 A1 | 7/2011 | Lin et al. | |
| 2012/0079312 A1* | 3/2012 | Muthrasanallur | G06F 11/0745 714/5.1 |
| 2012/0144230 A1* | 6/2012 | Buckland | G06F 13/4022 714/4.5 |
| 2013/0067127 A1* | 3/2013 | Hopgood | G06F 13/00 710/104 |
| 2015/0370642 A1 | 12/2015 | Arroyo et al. | |
| 2016/0147681 A1 | 5/2016 | Arroyo et al. | |
| 2016/0147697 A1 | 5/2016 | Arroyo et al. | |
| 2017/0300446 A1 | 10/2017 | Eide et al. | |

* cited by examiner

*Primary Examiner* — Philip Guyton
(74) *Attorney, Agent, or Firm* — VanLeeuwen & VanLeeuwen; Jason H. Sosa (57) ABSTRACT

An approach is provided in which an information handling system suspends operation of one or more components corresponding to a PCIe link that is operating at a reduced capacity. The information handling system then trains the PCIe link to an increased capacity while the one or more components are suspended in operation. In turn, the information handling system resumes operation of the one or more components and restores the PCIe link to the increased capacity.

11 Claims, 6 Drawing Sheets

PCIE LINK RESET TO MINIMIZE WORKLOAD IMPACT

BACKGROUND

The present disclosure relates to a host system that uses extended error handling to restore a reduced capacity PCIe link between the host system and an I/O expansion drawer to full capacity in a non-disruptive manner.

Peripheral Component Interconnect Express (PCIe) is a serial expansion bus standard for connecting a computer to peripheral devices. The PCIe standard is well known as a PC backplane interface standard, and has gained popularity as a high-speed cabling interface between a host system and I/O expansion drawers that increase, or "expand" the amount of PCIe slots of the host system. The high-speed cabling interface between the host system and I/O expansion drawer is referred to as a PCIe "link." A PCIe link may utilize multiple physical cables that each provide a portion of the PCIe link's "lanes."

When one of the physical cables becomes non-functional, such as from being disconnected or severed, the host system typically reconfigures the PCIe link to a reduced capacity, such as from 16 lanes to eight lanes, and utilizes the remaining functioning cables to communicate with the I/O expansion drawer. To restore the reduced capacity PCIe link to full capacity, the cable must be replaced or reconnected and the link retrained. Retraining a PCIe link impacts the PCIe slots connected by the link. Typically communications with the PCIe slots connected by the link are lost. Workloads using the PCIe slots connected by the link must be ended prior to retraining the link or the workloads may fail ungracefully.

BRIEF SUMMARY

According to one embodiment of the present disclosure, an approach is provided in which an information handling system suspends operation of one or more components corresponding to a PCIe link that is operating at a reduced capacity. The information handling system then trains the PCIe link to an increased capacity while the one or more components are suspended in operation. In turn, the information handling system resumes operation of the one or more components and restores the PCIe link to the increased capacity.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
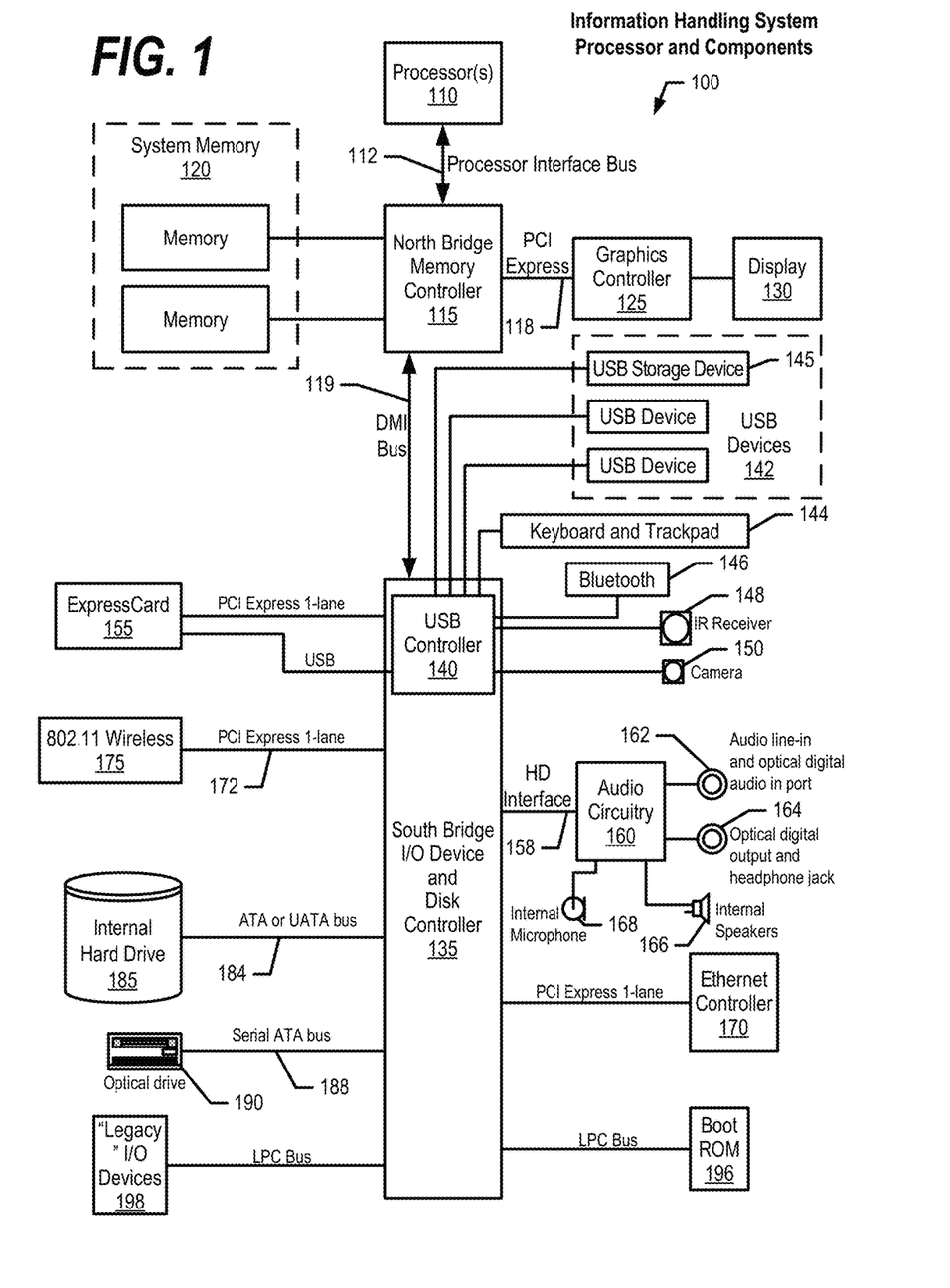
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
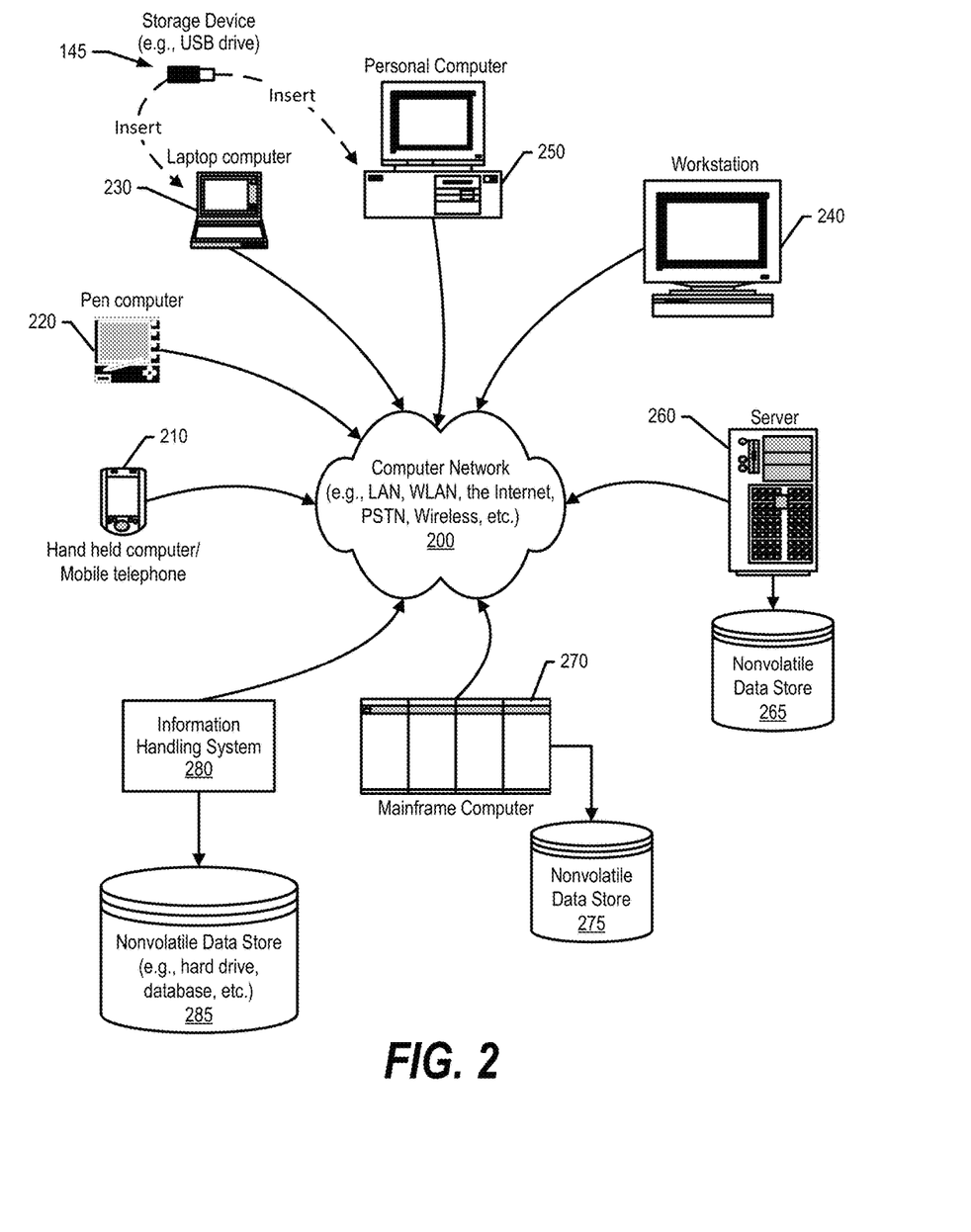
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depict separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 6 depict an approach that can be executed on an information handling system. In order to restore a reduced capacity PCIe link to full operation, IT personnel have previously been required to perform a partial or complete power cycle of the corresponding PCIe expansion drawer, which caused the PCIe slots in the PCIe expansion drawer to be taken offline and deconfigured. The process of reconfiguring the PCIe slot device drivers is time consuming, labor intensive, and disruptive to workloads running on the system. The information handling system described herein retrains a reduced capacity PCIe link to full capacity without having to power cycle the PCIe expansion drawer and, in turn, reduces the time and resources required to restore the reduced capacity PCIe link to full operation.

The information handling system described herein initiates an extended error handling (EEH) mode to freeze components (suspend operation) on the host and I/O expansion drawer to perform a controlled, non-disruptive restoration of a reduced capacity PCIe link to full capacity. This process restores a PCIe link to its full operation and returns recoverable error handling events to device drivers attempting to perform I/O operations to devices connected by the PCIe link. In turn, workloads using devices connected by the PCIe link continue to run while the PCIe link is being restored to full capacity. As such, IT personnel do not have to manually end workloads, move them to other servers, or manually deconfigure device drivers. In short, the information handling system described herein provides a much less disruptive and time-consuming approach to restore a reduced capacity PCIe link to full capacity.

Figure 3:
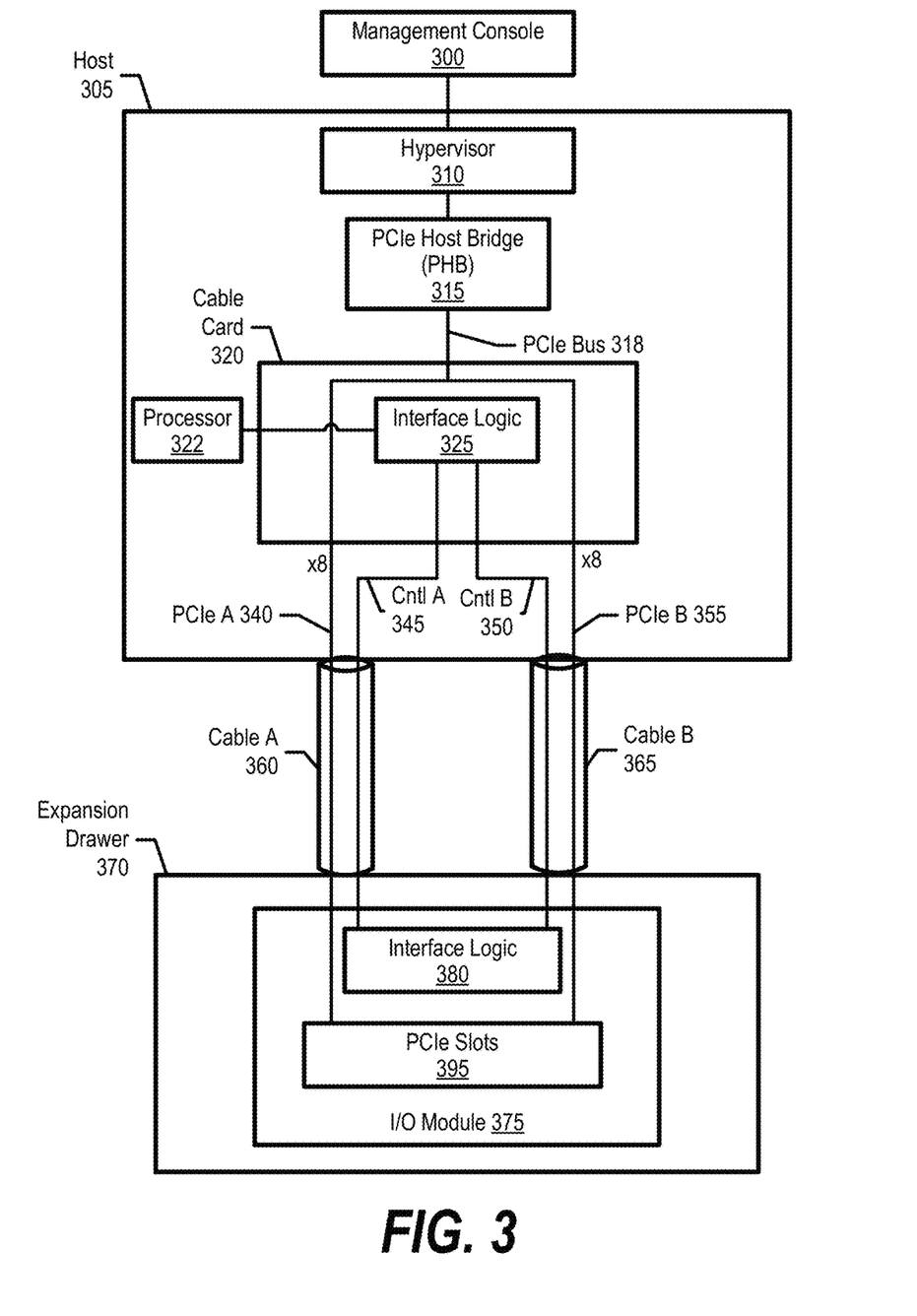
FIG. 3 is a diagram depicting a host system that uses extended error handling (EEH) to reset a reduced capacity PCIe link and restore it to full capacity while workloads that use PCIe slots connected by the link continue to run.

FIG. 3 is a diagram depicting a host system that uses extended error handling (EEH) to restore a reduced capacity PCIe link to full capacity in a non-disruptive manner. Host 305 includes hypervisor 310, which executes system firmware that monitors PCIe link capacity between host 305 and expansion drawer 370 utilizing cable A 360 and cable B 365. In one embodiment, cable A 360 supports "low byte" lanes (lanes 0-7) and cable B 365 supports "high byte" lanes (8-15). In one embodiment, the PCIe link may use more cables than what is shown in FIG. 3 to communicate between host 305 and expansion drawer 370.

Processor 322 communicates with interface logic 325 via, for example, an I2C bus. Interface logic 325 communicates with interface logic 380 via control A 345 and control B 350, which represent lanes that carry sideband or control signals to perform actions such as to power off and on PCIe slots on I/O module 375, collect VPD (vital product data), and collect error data. PCIe A 340 and PCIe B 355 represent the lanes that carry the PCIe bus traffic (the workload data that is being sent to and retrieved from PCIe slots 395).

When one of the two cables A 360 or cable B 365 becomes non-functional, such as when a cable becomes disconnected or is pinched in a raised tile floor and severed, hypervisor 310 detects a communication issue between host 305 and expansion drawer 370. Hypervisor 310 sends an error log to management console 300 and automatically reduces the capacity of the PCIe link, such as to half of its full capacity. Host system 305 utilizes the cable that is still functioning to pass traffic between host 305 and expansion drawer 370 at the reduced capacity, which allows the workloads to continue executing.

After a user receives the error log from management console 300 and corrects the cabling issue, the user sends a link reset request to hypervisor 310 via management console 300. Hypervisor 310 verifies that cable card 320 is powered on and powers on cable card 320 if required. Hypervisor 310 then verifies that sideband signals over control A 345 and control B 350 are enabled and enables them if required.

Figure 5:
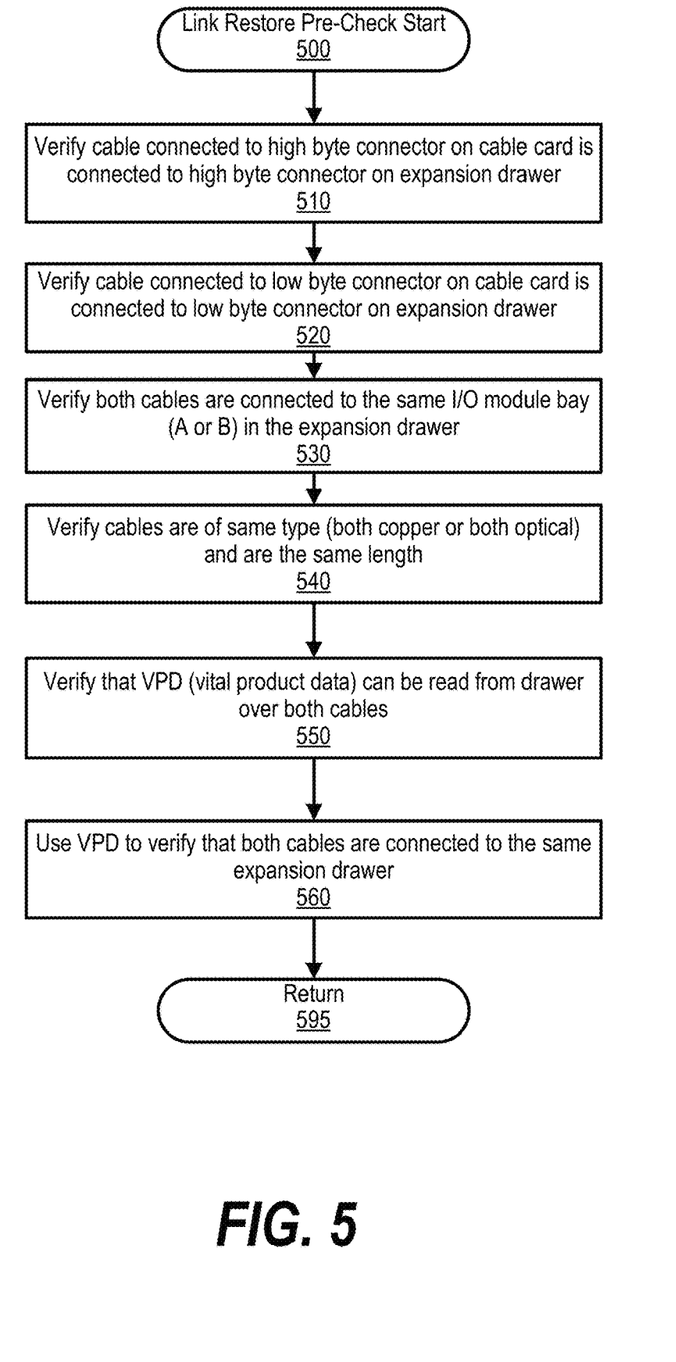
FIG. 5 is a flowchart showing steps taken to perform a PCIe link restore pre-check.

Next, hypervisor 310 performs a pre-check on the reduced capacity PCIe link to ensure a reset will not result in further degradation or total loss of communication over the PCIe link (see FIG. 5 and corresponding text for further details). When the pre-check passes, PCIe components corresponding to the reduced capacity PCIe link are placed in an extended error handling (EEH) mode. In one embodiment, hypervisor 310 resets PHB 315 which causes PHB 315 and PCIe slots connected to the PHB to enter EEH mode.

Hypervisor 310 then performs a specialized PCIe link reset initial program load (IPL) of cable card 320, which resets cable card 320 and, in one embodiment, does not update firmware to reduce the duration of the reset process. Next, hypervisor 310 performs a PCIe bus IPL that takes PHB 315 out of the 'freeze' state and causes the PCIe link to train to maximum capacity. At this point, the PCIe link is operating at full capacity. During the reset period, expansion drawer 370 is powered up and the workloads are still running. The EEH mode provides a sequencing and interlock between hypervisor 310 and device drivers in host 305's operating systems that execute within logical partitions (virtual machines) corresponding to the slots under the PCIe link being reset to ensure the reset processing and short outage of the adapters connected via the link are handled and recovered from in an architected fashion such that workloads notice at worst just a short pause in I/O operations to the adapters connected via the PCIe link.

Hypervisor 310 then takes PHB 315 out of EEH mode and logical partitions executing on host 305 are given permissions to begin EEH recovery of their corresponding partitionable endpoints (PCIe slots 395) in expansion drawer 370. PCIe slots 395 (partitionable endpoints) are taken out of the freeze state and begin a higher level recovery and initialization to resume normal operations using the fully operational PCIe link.

Figure 4:
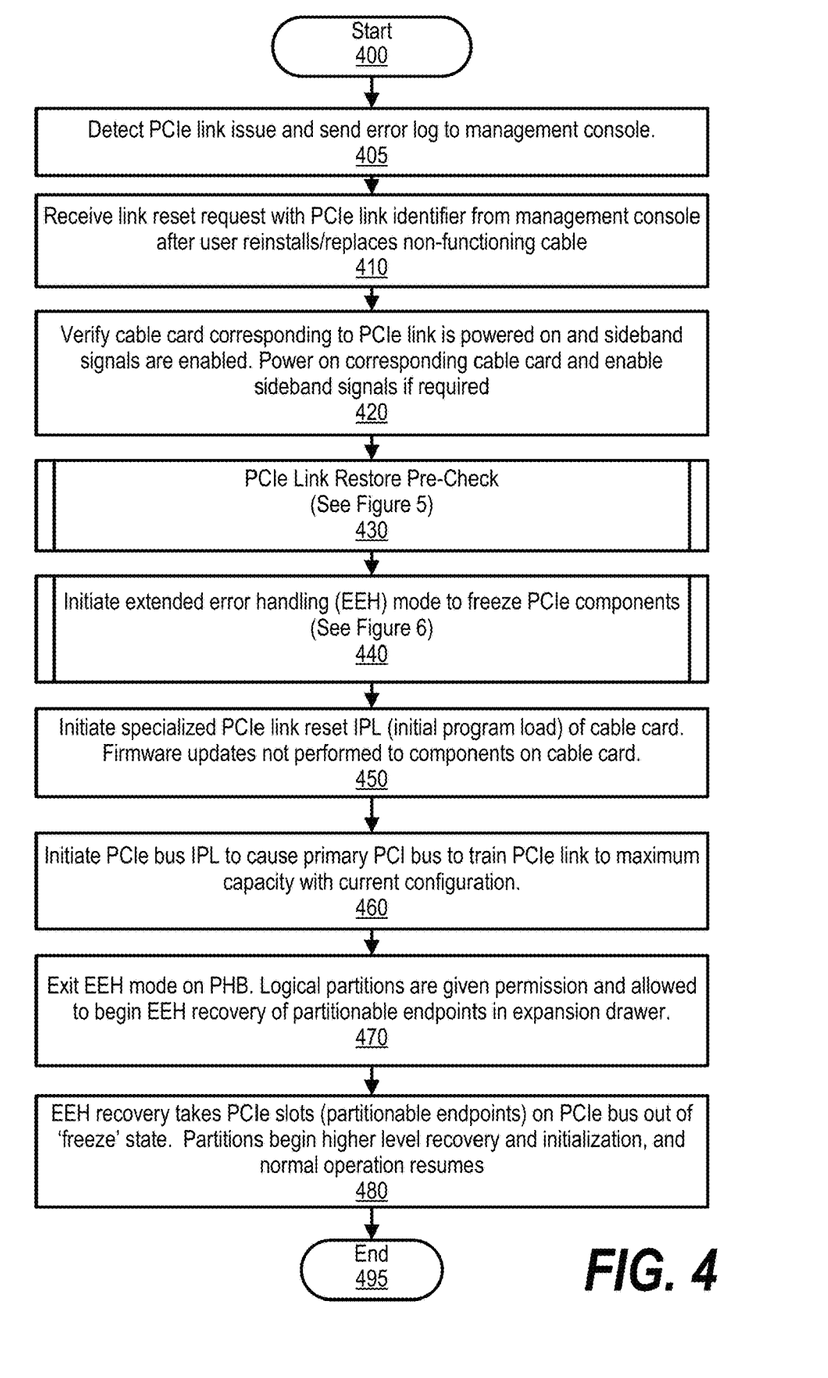
FIG. 4 is a flowchart showing steps taken to restore a reduced capacity PCIe link interfaced to an I/O expansion drawer while workloads that use PCIe slots connected by the link continue to run.

FIG. 4 is a flowchart showing steps taken to restore a reduced capacity PCIe link interfaced to an I/O expansion drawer. Processing commences at 400 whereupon, at step 405, the process detects a PCIe link issue and sends an error log to the management console to notify the user. For example, the error log may indicate that the lower byte PCIe lanes are not functioning.

At step 410, subsequent to a user reconnecting/replacing a non-functioning cable that corresponded to the error log, the process receives a link reset request from the management console that includes a link identifier identifying the reduced capacity PCIe link. At step 420, the process verifies the cable card (cable card 320) corresponding to the PCIe link is powered on and sideband signals (control A 345 and control B 350) are enabled. The process powers on the cable card and enables the sideband signals if required.

The process then performs a link restore pre-check to verify the cable connections and ensure that the host system and expansion drawer are ready to restore the reduced capacity PCIe link to full operation (pre-defined process block 430, see FIG. 5 and corresponding text for further details).

Figure 6:
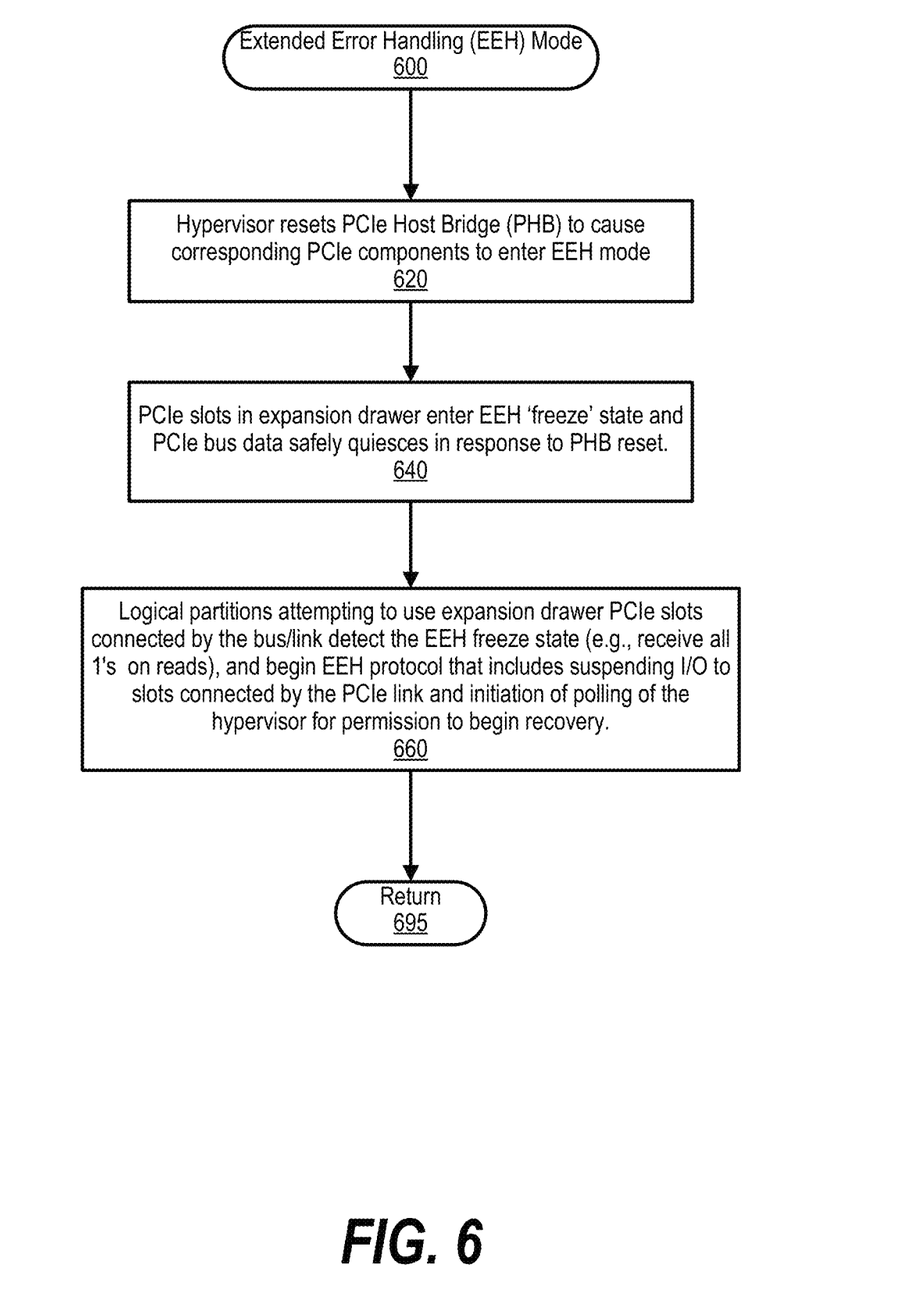
FIG. 6 is a flowchart showing steps taken to initiate an extended error handling mode that freezes PCIe components on the host system and I/O expansion drawer in preparation for a controlled, user initiated restoration of a reduced capacity PCIe link.

At step 440, the process initiates an extended error handling mode on PHB 315 to freeze PCIe components on the host and expansion drawer associated with the reduced capacity PCIe link (pre-defined process block 440, see FIG. 6 and corresponding text for further details).

Once the appropriate PCIe components are in the EEH mode freeze state, the process can perform a controlled restoration of the reduced capacity PCIe link. At step 450, the process initiates a specialized PCIe link reset IPL (initial program load) of cable card 320. In one embodiment, the specialized PCIe link reset IPL of the cable card does not perform firmware updates of components on the cable card in order to minimize the cable card IPL time. At step 460, the process initiates a PCIe bus IPL to cause PCIe bus 318 to train the PCIe link to maximum capacity with its current configuration. In one embodiment, the hypervisor sets registers in the PHB to cause the PCIe bus IPL.

Once the PCIe link is restored to full operation (e.g., 16 lanes), the process begins steps to resume communication between host 305 and expansion drawer 370. At step 470, the process takes the PHB out of EEH mode. In addition, logical partitions executing on the host are given permissions to begin EEH recovery of their corresponding partitionable endpoints (PCIe slots 395) in the expansion drawer. At step 480, in turn, the PCIe slots are taken out of freeze state and begin a higher level recovery and initialization to resume normal operations. Processing thereafter ends at 495.

FIG. 5 is a flowchart showing steps taken to perform a PCIe link restore pre-check. Processing commences at 500 whereupon, at step 510, the process sends/receives test signals over the high byte control lanes (Cntl B 350) to verify that the cable connected to the high byte connector on the cable card is connected to the high byte connector on expansion drawer. At step 520, the process sends/receives test signals over the low byte control lanes (Cntl A 345) to verify that the cable connected to the low byte connector on the cable card is connected to the low byte connector on expansion drawer.

At step 530, the process uses the control lanes (Cntl A 345) to read the position of the I/O module 375 that Cable A 360 is connected to, and uses the control lanes (Cntl B 350) to read the position of the I/O module 375 that Cable B 365 is connected to. The process analyzes the test responses to verify that both cables are connected to the same I/O module position (I/O module 375) in the I/O expansion drawer. Next, at step 540, the hypervisor utilizes I2C commands to instruct Interface logic 325 to read properties associated with cable A 360 and cable B 365 to verify the cables are of same type (both copper or both optical) and are the same length.

The process, at step 550, has the hypervisor instruct interface logic 325 via I2C commands to read expansion drawer vital product data (VPD) over each cable. If the VPD is successfully read over both cables, at step 560 the process analyzes the VPD to verify that both cables are connected to the same expansion drawer (I/O expansion drawer 370). FIG. 5 processing thereafter returns to its calling routine (see FIG. 4) at 595.

FIG. 6 is a flowchart showing steps taken to initiate an extended error handling mode that freezes PCIe components on the host system and I/O expansion drawer in preparation for a controlled, user initiated restoration of a reduced capacity PCIe link. FIG. 6 processing commences at 600 whereupon, at step 620, the hypervisor resets the PCIe Host Bridge (PHB) to cause it to enter EEH mode. In one embodiment, the hypervisor sets register bits in the PHB to put the PHB and PCIe slots 395 (partitionable endpoints connected by the PCIe link) into EEH freeze state. At step 640, with the PHB and PCIe slots under the PHB in EEH mode freeze state, PCIe bus traffic safely quiesces.

At step 660, logical partitions executing on host 305 and attempting to send/receive data to the frozen PCIe slots detect the EEH freeze state and begin their EEH protocol by polling the hypervisor for permission to begin recovery. In one embodiment, the logical partitions detect the EEH freeze state by receiving all 1's in response to reads directed to a corresponding PCIe slot. FIG. 6 processing thereafter returns to its calling routine (see FIG. 4) at 695 and the process may begin performing a controlled restoration of the reduced capacity PCIe link.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    suspending operation of one or more components corresponding to a PCIe link that is operating at a reduced capacity, wherein the PCIe link interfaces a host system to a PCIe I/O expansion drawer over a first physical cable and a second physical cable, and wherein the reduced capacity is caused by an issue with the first physical cable;
    determining that the first physical cable and the second physical cable are connected to an I/O module in a same position based on a first set of test response data received over the first physical cable and a second set of test response data received over the second physical cable;
    training the PCIe link to an increased capacity while the one or more components are suspended in operation; and
    restoring the PCIe link to the increased capacity subsequent to resuming operation of the one or more components.

2. The method of claim 1 wherein the PCIe link is restored without power cycling the one or more components.

3. The method of claim 1 further comprising:
    determining that the first physical cable and the second physical cable are a same type and a same length based on the first set of test response data and the second set of test response data.

4. The method of claim 1 further comprising:
    receiving a first set of vital product data over the first physical cable;
    receiving a second set of vital product data over the second physical data; and
    determining that the first physical cable and the second physical cable are connected to a same PCIe I/O expansion drawer, which is the PCIe I/O expansion drawer, based on analyzing the first set of vital product data and the second set of vital product data.

5. An information handling system comprising:
    one or more processors;
    a memory coupled to at least one of the processors;
    a set of computer program instructions stored in the memory and executed by at least one of the processors in order to perform actions of:
        suspending operation of one or more components corresponding to a PCIe link that is operating at a reduced capacity, wherein the PCIe link interfaces a host system to a PCIe I/O expansion drawer over a first physical cable and a second physical cable, and wherein the reduced capacity is caused by an issue with the first physical cable;
        determining that the first physical cable and the second physical cable are connected to an I/O module in a same position based on a first set of test response data received over the first physical cable and a second set of test response data received over the second physical cable;
        training the PCIe link to an increased capacity while the one or more components are suspended in operation; and restoring the PCIe link to the increased capacity subsequent to resuming operation of the one or more components.

6. The information handling system of claim 5 wherein the PCIe link is restored without power cycling the one or more components.

7. The information handling system of claim 5 wherein the processors perform additional actions comprising:
- determining that the first physical cable and the second physical cable are a same type and a same length based on the first set of test response data and the second set of test response data.

8. The information handling system of claim 5 wherein the processors perform additional actions comprising:
- receiving a first set of vital product data over the first physical cable;
- receiving a second set of vital product data over the second physical data; and
- determining that the first physical cable and the second physical cable are connected to a same PCIe I/O expansion drawer, which is the PCIe I/O expansion drawer, based on analyzing the first set of vital product data and the second set of vital product data.

9. A computer program product stored in a computer readable storage medium, comprising computer program code that, when executed by an information handling system, causes the information handling system to perform actions comprising:
- suspending operation of one or more components corresponding to a PCIe link that is operating at a reduced capacity, wherein the PCIe link interfaces a host system to a PCIe I/O expansion drawer over a first physical cable and a second physical cable, and wherein the reduced capacity is caused by an issue with the first physical cable;
- determining that the first physical cable and the second physical cable are connected to an I/O module in a same position based on a first set of test response data received over the first physical cable and a second set of test response data received over the second physical cable;
- training the PCIe link to an increased capacity while the one or more components are suspended in operation; and
- restoring the PCIe link to the increased capacity subsequent to resuming operation of the one or more components.

10. The computer program product of claim 9 wherein the PCIe link is restored without power cycling the one or more components.

11. The computer program product of claim 9 wherein the information handling system performs further actions comprising:
- receiving a first set of vital product data over the first physical cable;
- receiving a second set of vital product data over the second physical data; and
- determining that the first physical cable and the second physical cable are connected to a same PCIe I/O expansion drawer, which is the PCIe I/O expansion drawer, based on analyzing the first set of vital product data and the second set of vital product data.

* * * * *